Apr. 10, 1923.

T. J. BROOKS 1,451,386

METHOD OF AND APPARATUS FOR DETECTING FAULTY ENGINE CONSTRUCTION

Filed June 1, 1922

Witnesses:

T. J. Brooks
INVENTOR.
ATTORNEY

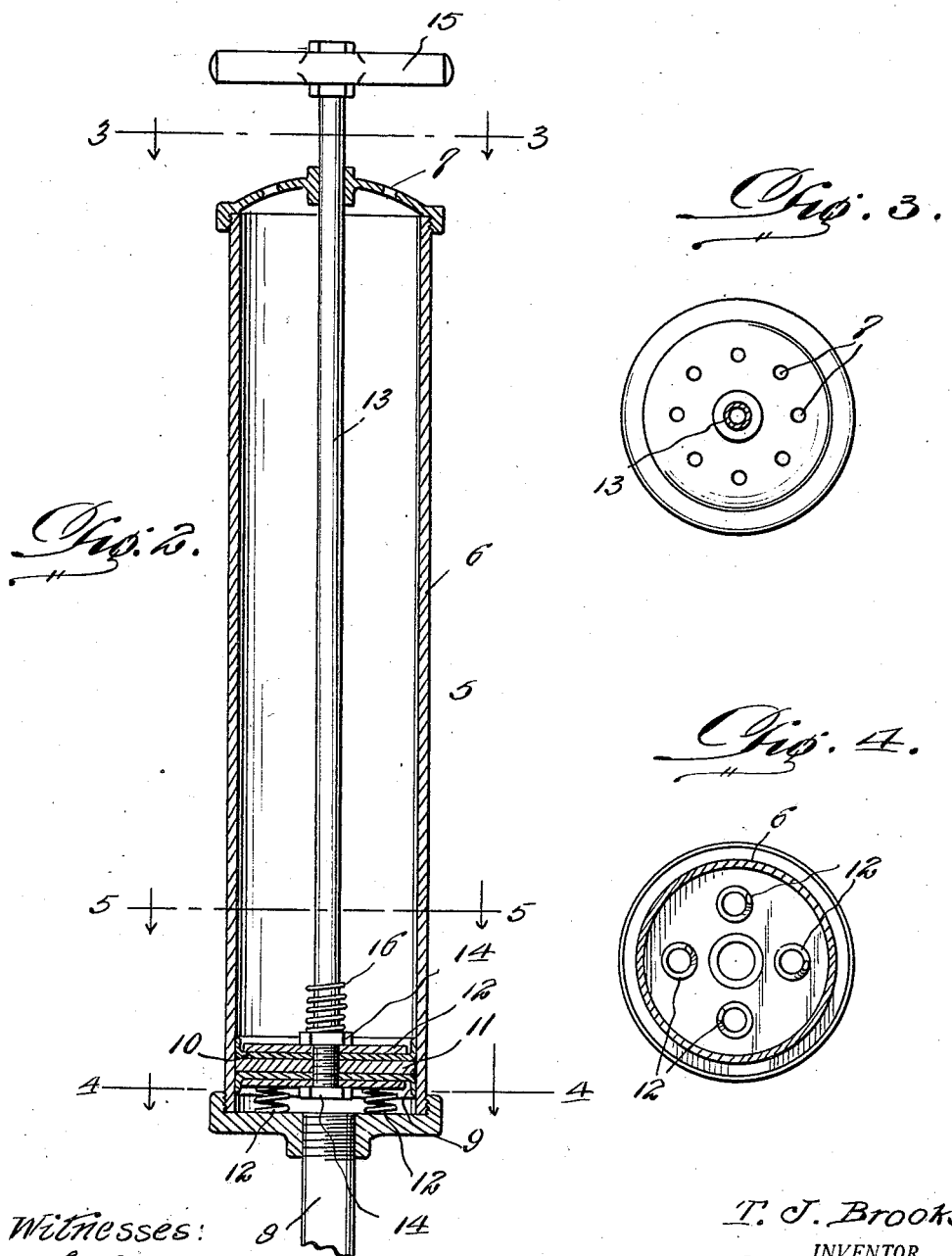

Apr. 10, 1923.  
T. J. BROOKS  
1,451,386  
METHOD OF AND APPARATUS FOR DETECTING FAULTY ENGINE CONSTRUCTION  
Filed June 1, 1922  
4 sheets-sheet 3

Witnesses:

T. J. Brooks
INVENTOR.
BY
ATTORNEY

Apr. 10, 1923.  
T. J. BROOKS  
1,451,386  
METHOD OF AND APPARATUS FOR DETECTING FAULTY ENGINE CONSTRUCTION  
Filed June 1, 1922   4 sheets-sheet 4

Witnesses:

T. J. Brooks,
INVENTOR.

BY

ATTORNEY

Patented Apr. 10, 1923.

1,451,386

UNITED STATES PATENT OFFICE.

THOMAS J. BROOKS, OF SHERIDAN, PENNSYLVANIA.

METHOD OF AND APPARATUS FOR DETECTING FAULTY ENGINE CONSTRUCTION.

Application filed June 1, 1922. Serial No. 565,178.

*To all whom it may concern:*

Be it known that I, THOMAS J. BROOKS, a citizen of the United States, residing at Sheridan, in the county of Lebanon and State of Pennsylvania, have invented new and useful Improvements in Methods of and Apparatus for Detecting Faulty Engine Construction, of which the following is a specification.

In carrying out the present invention it is my purpose to provide a method of and apparatus for detecting defective bearings, wrist pin connections, loose rings and other defects in engines of the reciprocating type without the necessity of dismantling the engine.

It is also my purpose to provide apparatus of the class described which will embrace the desired features of simplicity, efficiency and durability, which may be quickly and conveniently connected to the engine to be tested and which will operate effectively for its intended purpose.

A further object of my invention is the provision of an apparatus for detecting defects in reciprocating engines which may be manufactured and marketed at small cost, and which may be stored in small space when not in use, so that it may be carried about from place to place.

With the above recited objects in view, and others of a like nature, the invention resides in the construction, combination and arrangement of parts set forth in and falling within the scope of the appended claims.

In the accompanying drawings:

Figure 1 is a diagrammatic view partly in section showing my apparatus in use.

Figure 2 is a vertical sectional view through the pump employed in my apparatus.

Figure 3 is a horizontal sectional view on the line 3—3 of Figure 2.

Figure 4 is a like view on the line 4—4 of Figure 2.

Figure 6:
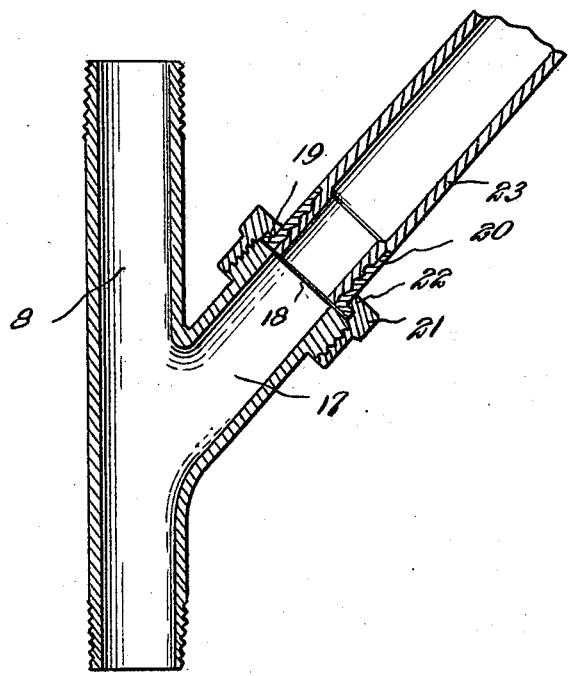
Figure 6 is a vertical sectional view through a detail of the invention.
Figure 5:
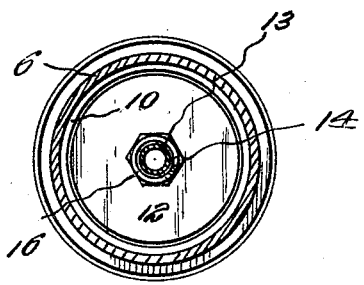
Figure 5 is a horizontal sectional view on the line 5—5 of Figure 2.

Referring now to the drawings in detail, 1 designates a vertical cylinder of an engine, which, in the present instance, is of the internal combustion type, while 2 indicates the piston mounted within the cylinder 1 and adapted to be reciprocated therein and connected through the medium of the connecting rod 3 to a crank shaft 4.

My improved apparatus embodies a pump 5 which, in this instance, comprises a cylinder 6 having its top and bottom ends closed and its upper end formed with vent holes 7 and its lower end equipped with a pipe 8 in open communication with the cylinder. The lower end of the pipe 8 is threaded exteriorly so that it may be threaded into the spark plug opening of the engine cylinder 1. Mounted for reciprocatory movement within the cylinder 6 is a plunger 9 which comprises in the present instance reversely disposed cup-shaped leather packing elements 10 spaced apart by means of a metal disk 11 and having their outer surfaces engaged by metal disks 12, respectively. These disks and the packing elements are formed centrally with alining openings through which is passed the lower end of a plunger rod 13, and threaded onto the inner end of the plunger rod 13 are nuts 14 which serve to hold the disks and packing elements in plunger forming relation and connected to the lower or inner end of the plunger rod 13, as clearly illustrated in Figure 2 of the drawings. The outer end of the plunger rod 13 is provided with a suitable handle 15 by means of which the plunger may be moved or reciprocated within the cylinder or barrel of the pump.

Disposed above and below the plunger are coil expansion springs 16, and in the present instance the springs below the plunger are connected to the end wall of the cylinder, while the spring above the plunger encircles the plunger rod 13. These springs act to cushion the movement of the plunger as it reaches the end of its stroke, thereby eliminating noise in the operation of the pump under the hand of the operator.

The pipe 8 is provided with a branch pipe 17 of suitable diameter and disposed over the outer end of the branch pipe 17 is a sound amplifying and transmitting diaphragm 18 and engaging the periphery of the diaphragm 18 is the flanged end 19 of a nipple 20. Threaded onto the branch pipe 17 is a union nut 21 that has its outer ends flanged inwardly, as at 22, to engage against the flange 19 on the nipple 20, and so hold the nipple and the diaphragm 18 in proper position upon the branch pipe 17.

Connected to the nipple 20 is one end of a flexible sound carrying tube 23, and connected to the outer end of the tube 23 is an ear piece 24 of suitable construction. In the present instance the ear piece 24 consists of a hollow body portion 25 having flat end walls 26 and a circular side wall 27 integral with the end walls. One end wall 26 is formed with an ear flange 28, while the other end wall is formed with a cone-shaped connecting nipple 29 in alinement with the ear flange and roughened exteriorly at its lower end portion to receive the corresponding end of the tube 23.

Figure 7:
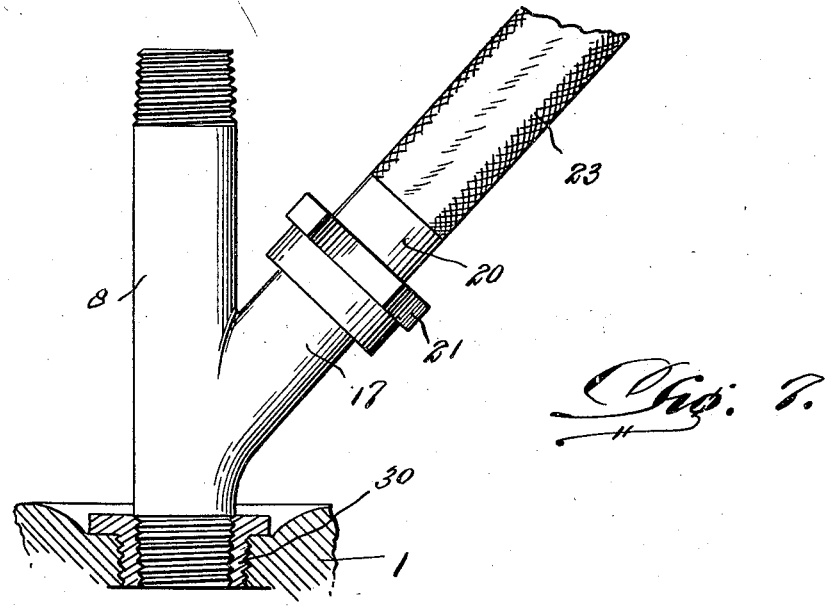
Figure 7 is a plan view showing a modified arrangement of the construction illustrated in Figure 6.
Figure 8:
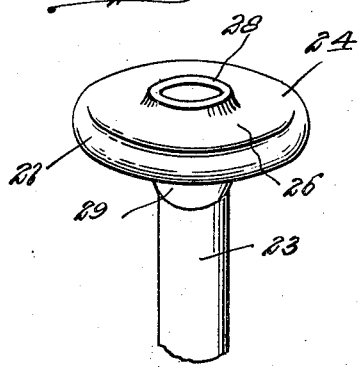
Figure 8 is a perspective view of the sound reproducer.
Figure 9:
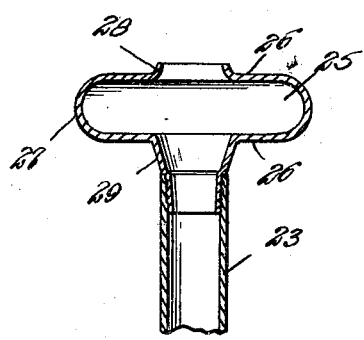
Figure 9 is a sectional view therethrough.

As shown in Figure 7 of the drawings, the pipe 8 may be connected with the spark plug opening of the cylinder by means of a reducer 30, this reducer being employed in the event of the spark plug opening being of greater diameter than the diameter of the pipe 8.

In practice, the pipe 8 is connected with the cylinder shown in Figure 1 of the drawings and the plunger operated within the cylinder 6 to produce a vacuum and a pressure alternately in the engine cylinder 1. As this vacuum and pressure are developed the piston 2 within the cylinder will be caused to move in the event of a loose wrist pin connection or a loose connecting rod bearing or loose rings, and as the pump plunger continues to be operated the sound produced by the defective part in the cylinder will be amplified by the diaphragm 18 and transmitted through the tube 23 to the ear piece 24 and by the interpretation of the sound the mechanician will be informed of the particular part that is defective.

While I have herein shown and described one preferred form of my invention by way of illustration, I wish it to be understood that I do not limit or confine myself to the precise details of construction herein shown and described, as modifications and variations may be made within the scope of the claims and without departing from the spirit of my invention.

Having thus described the invention, what is claimed as new, is:—

1. A detector for engines comprising a pump, means for connecting said pump to the engine cylinder, said pump being operable to create a vacuum and pressure in said cylinder and so influence the piston therein to move in the event of the piston being loose and a sound transmitter connected to said means whereby any sounds given off by the piston may be interpreted.

2. A detector for engines comprising a pump, means for connecting said pump to the engine cylinder, said pump being operable to create a vacuum and pressure in said cylinder and so influence the piston therein to move in the event of the piston being loose, a sound transmitter connected to said means whereby any sounds given off by the piston may be interpreted, said sound transmitter comprising an amplifying and transmitting diaphragm, a flexible tube in communication with said diaphragm and an ear piece on said tube.

In testimony whereof I affix my signature.

THOMAS J. BROOKS.